(12) United States Patent
Nosenchuck (10) Patent No.: US 6,393,208 B1
(45) Date of Patent: May 21, 2002

(54) COMPRESSOR WITH INTEGRATED IMPELLER AND MOTOR

(76) Inventor: Daniel M. Nosenchuck, 6 Razorback Dr., Mercerville, NJ (US) 08619

( * ) Notice: Subject to any disclaimer, the term of this patent is extended or adjusted under 35 U.S.C. 154(b) by 0 days.

(21) Appl. No.: 09/638,716

(22) Filed: Aug. 14, 2000

(51) Int. Cl.⁷ .............................................. A45D 20/10
(52) U.S. Cl. ......................... 392/384; 34/97; 417/356; 417/423.7
(58) Field of Search ................................ 392/384, 385; 34/96, 97; 417/356, 355, 423.7; 416/3; 415/10; 310/63

(56) References Cited

U.S. PATENT DOCUMENTS

| | | | | |
|---|---|---|---|---|
| 1,926,444 A | * | 9/1933 | Jones | 417/356 |
| 1,996,195 A | * | 4/1935 | Ferguson | 417/356 |
| 2,697,986 A | * | 12/1954 | Meagher, Jr. | 417/356 |
| 3,715,171 A | * | 2/1973 | Kettner | 416/142 |
| 4,459,087 A | * | 7/1984 | Barge | 417/356 |
| 4,949,022 A | * | 8/1990 | Lipman | 417/356 |
| 4,953,811 A | * | 9/1990 | Smith | 417/356 |
| 4,962,734 A | * | 10/1990 | Jorgensen | 417/356 |
| 5,075,606 A | * | 12/1991 | Lipman | 318/254 |
| 6,194,798 B1 | * | 2/2001 | Lopatinsky | 417/356 |

FOREIGN PATENT DOCUMENTS

| | | | | |
|---|---|---|---|---|
| EP | 567688 | * | 11/1993 | 417/356 |
| EP | 606054 | * | 7/1994 | 417/356 |
| JP | 1-177496 | * | 7/1989 | 417/356 |
| JP | 3-160194 | * | 7/1991 | 417/356 |
| JP | 3-277151 | * | 12/1991 | |
| JP | 5-180191 | * | 7/1993 | 417/356 |
| RU | 2065713 | * | 8/1996 | |
| SU | 1567169 | * | 5/1990 | |

OTHER PUBLICATIONS

Feynman, Richard P., et al., *The Feynman Lectures on Physics*, Addison–Wesley (1964), pp. 16–7 to 16–8.

* cited by examiner

*Primary Examiner*—John A. Jeffery
(74) *Attorney, Agent, or Firm*—David M. Quinlan, P.C.

(57) ABSTRACT

A pump or compressor for transporting a fluid comprises an impeller includes a plurality of impeller elements disposed for rotation to impart kinetic energy to the fluid. The impeller, which in one embodiment is an axial flow compressor, has an electrically conductive ring or other conductive members disposed along a rotary path of the impeller. An impeller driver includes a ring of magnetically permeable material extending in an arc proximate to the rotary path of the conductive portion of the impeller. The impeller driver acts as a motor stator with two core portions wound with electrically conductive coils for inducing a magnetic field in the ring and two electrically conductive pole portions spaced from the core portions. Alternating electrical current introduced to the coils imparts a rotary force to the electrically conductive ring of the impeller, causing it to transport the compressor working fluid.

23 Claims, 4 Drawing Sheets

COMPRESSOR WITH INTEGRATED IMPELLER AND MOTOR

BACKGROUND OF THE INVENTION

1. Field of the Invention

The present invention relates to a compressor having an integrated impeller and motor, and more particularly, to such a compressor used as a fan for a consumer device.

2. Description of Related Art

There are myriad different uses to which consumers can put products that create a stream of fluid. For example, U.S. Pat. No. 4,593,179 lists drying wet clothes and shoes, hydrotherapy, vacuum cleaning and drying hair. Other consumer products employing a stream of air that come to mind are space heaters, air conditioners, ventilating fans, humidifiers and dehumidifiers.

In any consumer device, noise is an important factor. A significant source of noise in any rotating machinery, such as a compressor or fan device used to create a fluid flow, is the mechanism used to provide the motive power that drives the compressor or fan. Typically, this includes an electric motor and some sort of transmission mechanism for applying the motive force of the motor to the compressor or fan.

The motor itself has rotating parts that create so-called "dipole noise." In addition, vibrations induced by the motor are propagated to the surrounding area as noise by the parts of the device to which the motor is mounted. Noise is also created by the transmission mechanism connecting the motor to the compressor or fan device. For example, the motor shaft may be connected to the compressor shaft by a gearing mechanism, which is inherently noisy due to the impact of the meshing gears against each other.

The noise attributable to the transmission mechanism can be eliminated by mounting the compressor on the motor shaft. However, in an axial flow device, such as the axial flow hair dryer shown in U.S. Pat. No. 4,596,921, this on-axis motor mounting puts the motor in the duct for the compressor working fluid. That significantly cuts down on the volume fluid flow that can be pumped by the device.

Also known are motorless compressor devices, in the sense that the compressor rotor forms part of the motor. Such motors are shown in U.S. Pat. Nos. 2,629,330, 4,758,132 and 5,607,329, and in Japanese Laid-Open Application No. 2-214439. However, none of them are particularly suited for consumer devices for a variety of reasons relating to the complexity of their construction or various aspects of their manner of operation. For example, U.S. Pat. No. 2,629,330 uses direct current and would require electronics to convert regular household alternating current, thus adding significantly to the cost of the device.

SUMMARY OF THE INVENTION

It is an object of the present invention to provide a compressor or pump that eliminates the need for a separate motor, thus significantly reducing the noise generated during operation, yet is simple and economical to construct.

It is another object of the present invention to provide a compressor that does not require a separate motor to supply the motive force therefor, thus eliminating the cost of the separate motor.

It is yet another object of the present invention to provide a motorless axial flow compressor that eliminates the flow blockage of an on-axis motor mounting.

In accordance with one aspect of the present invention, a pump for transporting a fluid comprises a rotary impeller member including a plurality of impeller elements disposed for imparting kinetic energy to the fluid as the impeller member rotates, the impeller member including an electrically conductive portion, an impeller driver including a magnetically permeable stator extending in an arc proximate to a rotary path of the conductive portion as the impeller member rotates, the impeller driver including a core portion with an electrically conductive winding for inducing a magnetic field in the stator and an electrically conductive pole portion spaced from the core portion, and means for introducing alternating electrical current to the winding for imparting a rotary force to the electrically conductive portion of the impeller member.

In accordance with a more specific aspect of the invention, a pump in accordance therewith is incorporated into a hair dryer. The invention is particularly adapted for an axial flow hair dryer having counter-rotating impellers.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

DETAILED DESCRIPTION OF PREFERRED EMBODIMENTS

FIGS. 1 to 4 illustrate one embodiment of the invention installed in a hand-held hair dryer 10. The present invention has particular utility in consumer products such as hair dryers because of the noise reduction achieved using the motorless compressor of the present invention. However, it is important to understand that the invention in its broadest aspects is not limited to the form shown in the drawings, or to use in a hair dryer or any other particular device.

Figure 1:
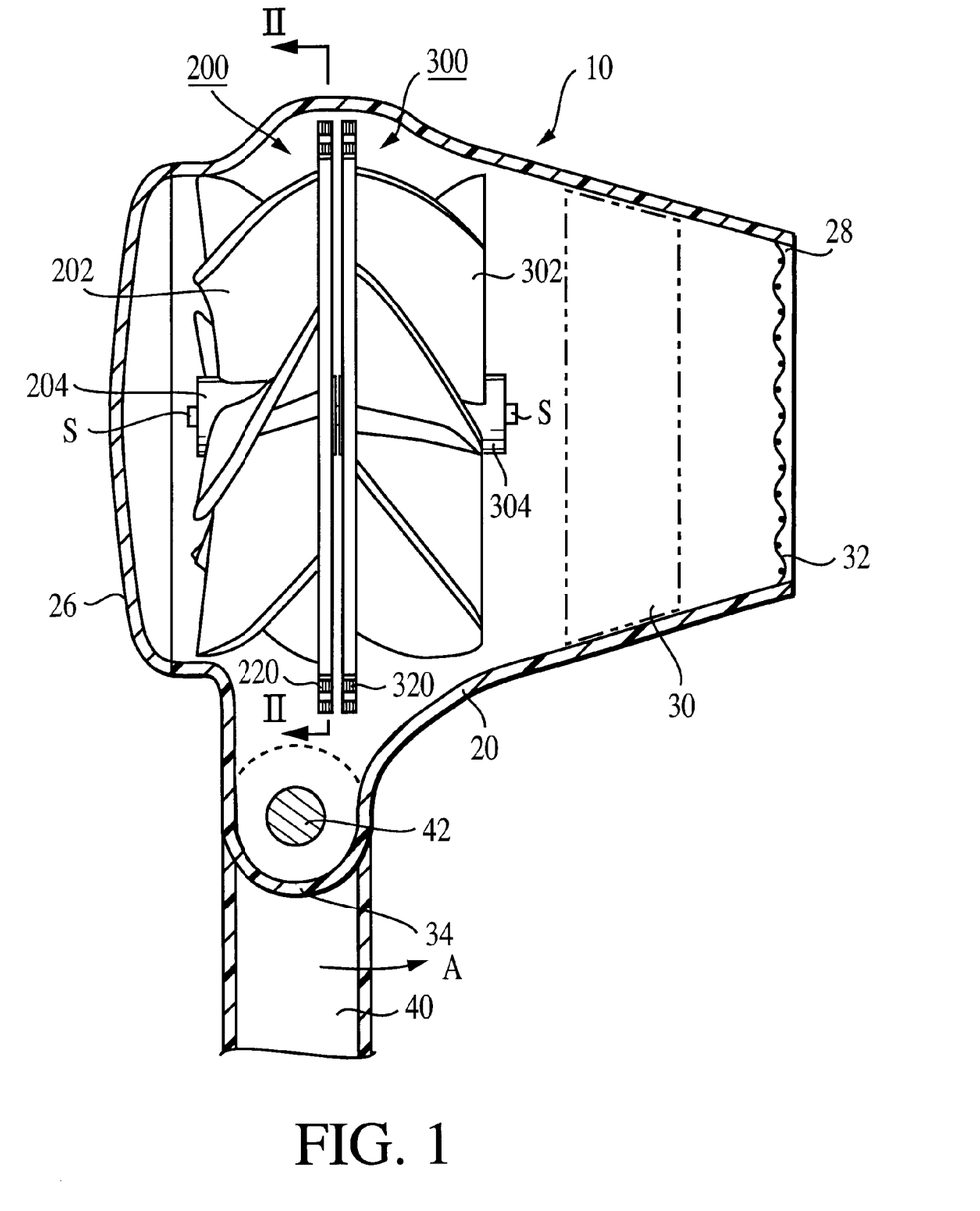
FIG. 1 is a cross-sectional view of a motorless compressor in accordance with one embodiment of the present invention, taken along the axis of counter-rotating axial flow impellers used therein, installed in a hair dryer.
Figure 2:
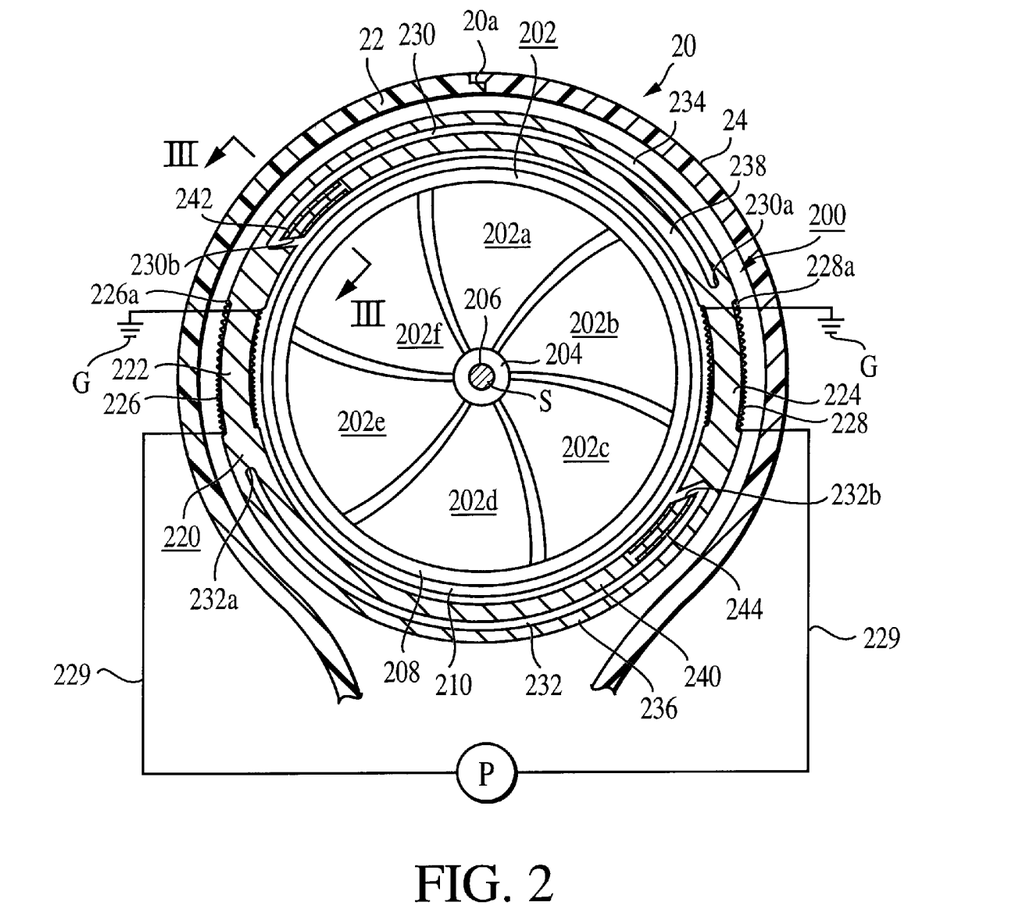
FIG. 2 is a cross-sectional view taken along line II—II in FIG. 1.

As best seen in FIG. 1, the hair dryer 10 includes a main housing 20 that is conventionally molded in two halves 22 and 24 that join along a line 20a as illustrated in FIG. 2. The edges of the halves have mutually offset flanges that mate with each other to more positively locate the housing halves 22 and 24 with respect to each other. The main housing 20 can be constructed in any convenient manner known in the art.

The housing 20 provides a duct for air flowing through the hair dryer from an inlet 26 for ambient air to an outlet 28 for heated air that is directed at the user's hair. The inlet may be conventionally formed of a domed plate with honeycomb apertures that permit air flow therethrough but prevent a user's fingers from being inserted into the housing and contacting the impellers that induce air flow through the housing in the manner described below. A heating coil 30 is disposed within the path of the air flow through the housing. The heating coil is depicted schematically in phantom lines in FIG. 1, it being a conventional component of hand held hair dryers. Typically, it is formed of a wire coiled around a mica support, but any suitable heating device may be used. A screen 32 is conventionally placed at the outlet 28 to permit air flow therethrough but prevent a user's fingers from contacting the heating coil 30.

At its bottom the housing 20 includes a depending hinge structure 34 to which a handle 40 is attached by a hinge pin 42. The handle 40 is hollow and includes electrical wiring and switches (not shown) for controlling the flow of electric current to energize the heating coil 30 and to drive the impellers in accordance with the present invention as described in detail below. The handle is hinged to the housing to permit it to be pivoted as shown by the arrow A. The handle 40 will typically occupy the position shown in FIG. 1 for operation of the hair dryer. It can be moved from this operative position and folded to a stowed position wherein it lies against the underside of the housing 20. In this configuration the dryer 10 takes up less space and makes it easier to pack for traveling, for example.

Air flow is induced through the housing from the inlet 26 to the outlet 28 by a pair of motorless axial flow impeller systems 200 and 300 in accordance with the present invention. The impeller of the upstream system 200 rotates in one direction and the impeller of the downstream system 300 rotates in the opposite direction. Counter-rotating impellers are known to increase air flow at a given rotational speed, thus reducing the noise for a given air flow. That is, because the dipole noise generated by rotating machinery increases as the sixth power of angular velocity, any reduction in rotational speed can significantly reduce the noise produced. This effect is discussed in detail in my prior U.S. Pat. Nos. 5,841,943 and 6,011,903.

The use of counter-rotating axial flow impellers in a hair dryer has been suggested before. Examples of attempts to provide such a hair dryer are shown in Japanese Laid-Open Applications No. 61-31696 and No. 3-82402 and Soviet Patent No. SU 1,433,465. However, until now there has been no really practical manner of achieving the advantages of such an arrangement. As will be apparent from the following description, the present invention enables realization of such a hair dryer.

The structure and operation of the impeller systems 200 and 300 are sufficiently alike that only one of them need be described in detail. One major difference is that although an axial view of the impeller system 300 taken in the same direction as the axial view of the impeller system 200 shown in FIG. 2 would show the same basic structure, it would be rotated 180° about a vertical axis. The following describes the impeller system 200 in detail, and other aspects in which the impeller system 300 differs therefrom, principally to provide counter-rotation, will be noted as the discussion proceeds. In the drawings, individual components of the impeller system 300 are identified by 300-series reference numerals. These components are not necessarily mentioned in the following discussion, but it will be understood that 200- and 300-series components correspond to each other.

The impeller system 200 includes an axial flow impeller member 202. The impeller members 202 and 302 are mounted on a common shaft S, which in turn is suitably mounted to the housing 20. The mounting of the shaft S can be accomplished by spokes (not shown) secured to the inside of the housing and extending radially inwardly at two or more locations to hubs that rigidly hold the shaft S. The spokes will typically support the shaft S both upstream of the upstream impeller member 202 and downstream of the downstream impeller member 302. The spokes will be as rigid as possible, and can be made from metal or plastic. They will typically be configured to present as little cross-sectional area to the air flow as possible in order to reduce the amount of obstruction to flow through the duct. It is particularly important that the shaft S be held rigidly in order to minimize vibrations as the impeller members rotate. That further reduces the noise generated by the impeller members.

The impeller member 202 includes six blades 202*a*, 202*b*, 202*c*, 202*d*, 202*e* and 202*f*, which serve as impeller elements for imparting kinetic energy to the compressor working fluid, here the air flowing through the hair dryer 10. The blades are attached at a radially inward end to a hub 204. The hub 204 has a central opening 206 that holds a bearing (not shown) for enabling the impeller member 202 to freely rotate on the shaft S. At their radially outward ends the blades are attached to an outer ring 208.

The impeller member 302 will typically have a different number of blades than the impeller member 202. That will prevent unwanted resonances due to interaction with the wakes from the upstream impeller blades. That is, if both impeller members have the same number of blades, the number of wakes from the upstream blades would be the same as the number of downstream blades. The resulting regularity in the blade-wake interactions can cause resonance and produce unwanted noise. In addition, an optimized configuration will use upstream blades with a different airfoil from that of the downstream blades, since the air flow conditions encountered by each impeller's blades are different. As those skilled in the art will recognize, the downstream impeller not only imparts kinetic energy to the flow, but reduces rotational components thereof in order to maximize the kinetic energy of the flow in the axial direction in the duct.

The blades, hub and outer ring are integrally molded of a suitable plastic material in one piece. Typically, the axle will be made of steel and the bearing will be a brass sleeve molded in place in the hub 204. The outer ring 208 provides a mounting structure for an electrically conducting ring 210 that is molded in place around the outside of the outer ring 208. The conducting ring 210 could also be press-fit onto the outer ring 208 after the integral plastic portion of the impeller member has been molded. The electrically conducting ring can be of any appropriate substantially nonmagnetically-permeable material with a suitable electrical conductivity, but typically it will be a nonferrous metal, preferably copper or aluminum. (The impeller member 202 with the conducting ring 210 is not shown in section in FIG. 2 to simplify the depiction thereof.) The configuration of the impeller member 202 can also be appreciated by reference to the perspective view in FIG. 4.

Those skilled in the art will appreciate that other assembly techniques can be used to equal effect. That is, the configuration of the impeller member 202 is representative, and many variations therein are possible consistent with the present invention. For example, the outer ring 208 can be eliminated and the conductive ring 210 secured thereto by an interference fit, as mentioned above. Alternatively, the conductive ring could include a circumferential groove on its inner, annular surface that snap-fits over a small protrusion on the outer edges of the blades. As another alternative, the conductive ring could be injection molded in place on the impeller member.

A stator ring 220 of ferromagnetic material such as an iron alloy, or any other magnetically permeable material, is secured to the housing 20 in surrounding relationship to the impeller member 202 to drive the impeller member rotationally about the shaft S. The stator ring includes two diametrically opposed core portions 222 and 224. As used herein, the term "core portion" is meant to refer to that part of the motor stator which introduces magnetic flux into the stator ring. In the present embodiment, the core portions 222 and 224 are formed by electrical windings 226 and 228, respectively.

The windings are disposed in recesses 226a and 228a formed in the stator ring so that the core portions are flush with the inner and outer circumferential extent of the stator ring 220. Each core portion 222,224 extends about 30° around the circumference of the stator ring 220. These core portions are symmetrical about a diameter of the ring. The power generated by the motor depends on the strength of the magnetic field in the stator, and the strength of the magnetic field can be increased by using windings with more turns, as those skilled in the art will understand.

A source P of alternating current is introduced to the coils 226 and 228 connect by any suitable structure, represented schematically in FIG. 2 by wires 229. The current source P will typically be the 110 volt, 60 Hz, household current available in the United States or the 220 volt, 50 Hz, household current available in other parts of the world. One of the advantages of the present invention is that is can use household current as supplied. If the voltage is to be changed in accordance with the power requirements of the motor, a transformer may be incorporated into the hair dryer.

The coils 226,228 are wound and connected to the current source and ground G so that the magnetic field induced by both is in the same circumferential direction in the stator ring 220. In fact, those skilled in the art will recognize that two core portions are not necessary. A single core portion will in some applications be sufficient or desirable. In addition, the core portions need not actually be part of a stator ring. In other words, the use of any structure that introduces magnetic flux into the stator ring is within the scope of the present invention. It will also be appreciated that the stator need not be a ring that surrounds the impeller member and that it can assume other configurations consistent with the principles of operation discussed herein.

As noted above, the impeller members 202 and 302 are intended to rotate in opposite directions. Accordingly, the energizing coils for the stator ring 320 are wound and connected to the source of electrical current so that the magnetic field in the stator ring 320 is in the opposite circumferential direction from the magnetic field induced by in the stator ring 220.

The stator ring 220 also comprises two shaded poles. The stator ring 220 includes circumferential slots 230 and 232 that form respective outer rings 234 and 236 and respective inner fingers 238 and 240. Shaded poles are formed on the fingers 238 and 240 by conductive sheaths 242 and 244, respectively.

Figure 3:
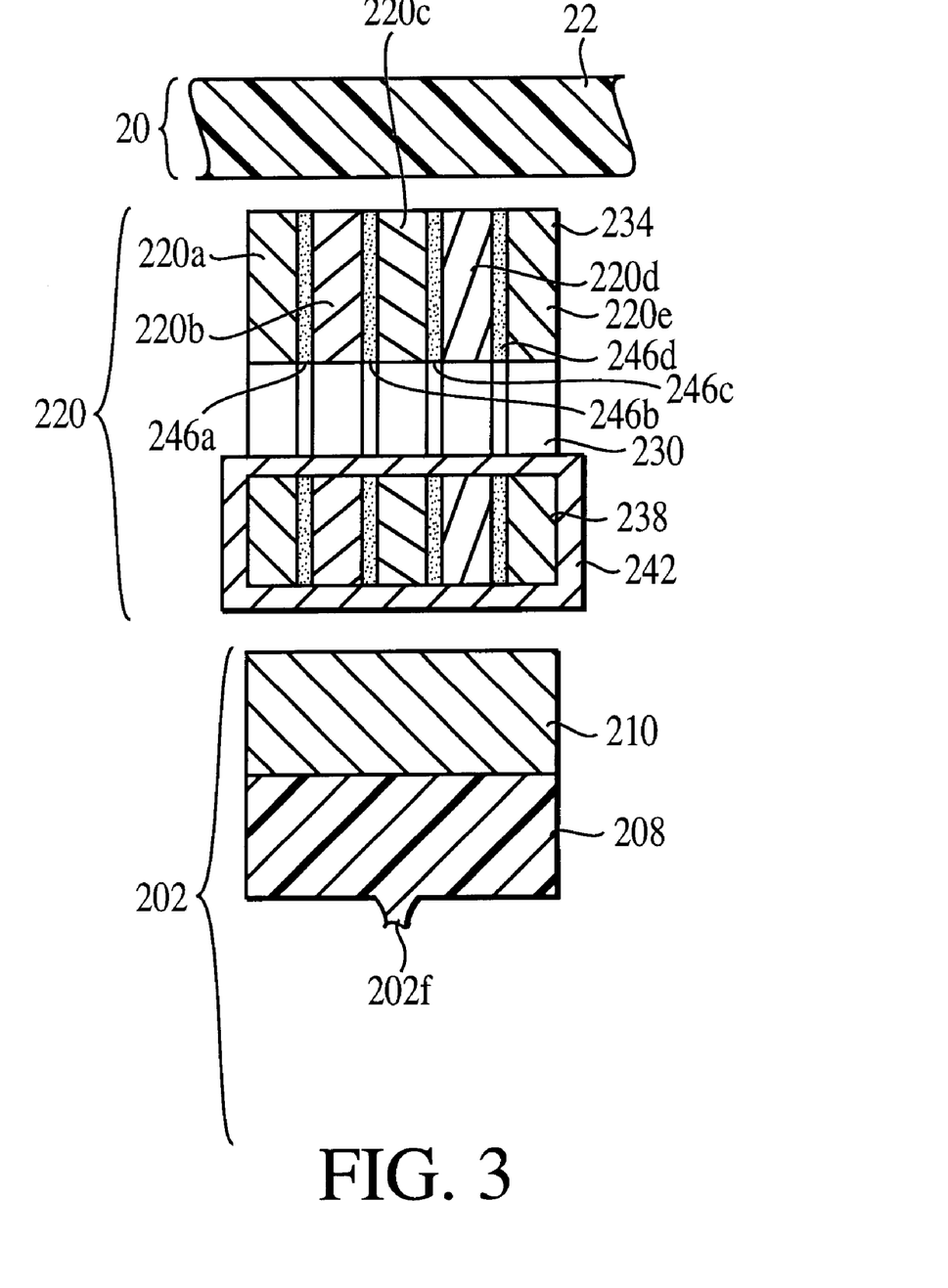
FIG. 3 is a cross-sectional view taken along line III—III in FIG. 2.
Figure 4:
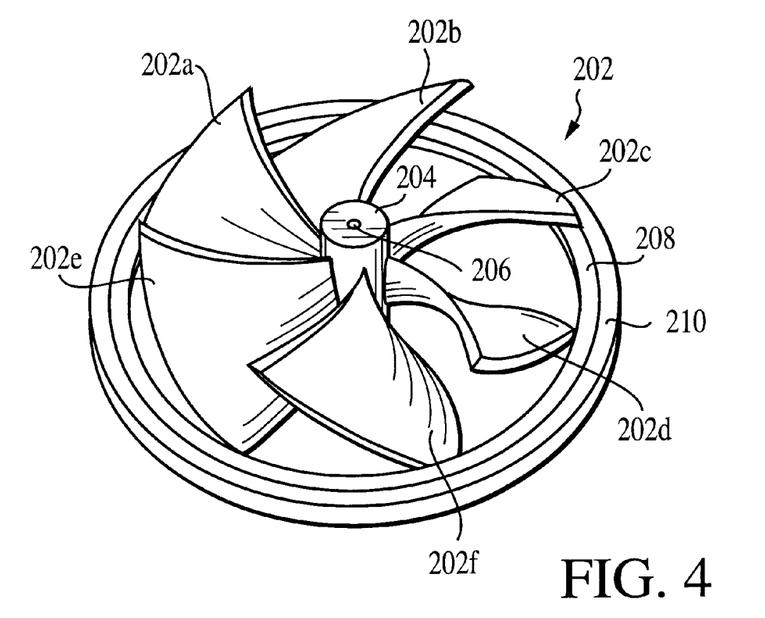
FIG. 4 is a perspective view of one of the impellers in the hair dryer depicted in FIG. 1.

As shown in FIG. 3, the stator ring 220 is formed collectively by plural individual stator laminations 220a, 220b, 220c, 220d and 220e bonded together with dielectric layers 246a, 246b, 246c and 246d interposed between facing axial surfaces of the axially adjacent individual laminations. This laminar arrangement is a standard motor stator construction that reduces losses associated with the magnetic field induced in the stator as compared to using a monolithic stator. The dielectric layers can be any suitable electrically nonconducting material, a conventional one being lacquer.

Each individual stator lamination 220a, . . . , 220e, is formed from an annular ring with a circular outer diameter that will permit it to be secured in the main housing 20 at the desired axial location and a circular inner diameter that is suitably matched to the outer diameter of the conducting ring 210 on the impeller member 202. The individual stator laminations are formed of an iron alloy such as is typically used for transformer cores. It will be appreciated that any magnetically permeable material can be used for this purpose.

The outer diameter of the stator ring 220 is slightly smaller than the inner diameter of the hair dryer housing 20 to permit air to flow around the stator ring for cooling purposes. The radial distance from the stator ring inner diameter to the impeller conductive ring 210 is as small as possible after taking into account manufacturing tolerances. The strength of the magnetic field surrounding the stator ring decreases as the distance from the stator ring increases. Since the effectiveness of the motor depends in large measure on the degree of inductive coupling between the stator ring and the conductive portion of its associated impeller member, the distance between the two should be minimized as much as possible.

The circumferentially extending slots 230 and 232 are milled into the solid ring so that the blind end 230a, 232a of each is about 60° from the open end 230b, 232b of the other. This makes the fingers 238, 240 as long as possible, and therefore makes it possible to tailor the circumferential extent of the poles formed by the sheaths 242 and 244 to give optimum motor performance.

The individual laminations 220a, . . . , 220e thus formed are bonded together with the dielectric layers 246a, 246d between their axial faces to form a stator ring blank. The recesses 226a and 228a are milled into the blank equidistant from the ends of the slots 230 and 232. Recesses are then formed at the open ends 230b and 232b of the inner fingers 238 and 240 on their inner and outer faces to a depth corresponding to the thickness of the conductive sheaths 242 and 244. The conductive sheaths 242 and 244 are thus flush with the inner and outer surfaces of the inner fingers 238 and 240 when they are bonded in place around the fingers. The coils 226 and 228 of insulated wires are then wound into the recesses 226a and 228a so that they are flush with the inner and outer surfaces of the coil portions 222 and 224. The conductive coils may be secured in place by a suitable potting material (not shown).

In operation, the alternating current P induces time-varying magnetic fields in the ferromagnetic stator rings 220 and 320. The magnetic field in each stator ring induces a current in the conductive outer ring 210 and 310 of the corresponding impeller member. The shaded poles formed by the conductive sheaths (240 and 242 on the stator ring 220) cause the magnetic field in the stator member to vary circumferentially, which imparts a rotational force on the inductively coupled conductive portion of the associated impeller member.

Those skilled in the art will recognize this construction as a known shaded pole motor by virtue of the fact that it has poles "shaded" by electrically conductive, substantially nonmagnetically-permeable portions, which in the present embodiment are provided by the conductive sheaths 240 and 242. Any construction used to enhance or optimize the performance of such motors can be readily incorporated into the present invention where applicable.

When a user activates an ON switch of the hair dryer 10, a variable magnetic field is induced in the stator rings 220 and 320. Since this magnetic field varies at 3600 cycles per minute (when using United States household current at 60 Hz), the impeller members 202 and 302 will rotate at about 3300 rpm, with their precise speed determined by the properties of the particular motor construction. As those skilled in the art will appreciate, the speed of the motor armature in such a shaded pole motor perforce is less than the frequency of the magnetic field induced in the motor stator. In the embodiment shown, the impeller members rotate in opposite directions, thus creating an air flow from the inlet 26 to the outlet 28 over the heating coil 30.

Different drying capacities can be achieved by providing a switch on the air dryer that varies the current supplied to the heating coil 30. The hair dryer can also have a so-called "cold shot" feature whereby the heating coil is de-energized. The electrical connections and switching for accomplishing these conventional hair dryer operational modes is well within the capacity of one skilled in this art without further explanation.

Figure 5:
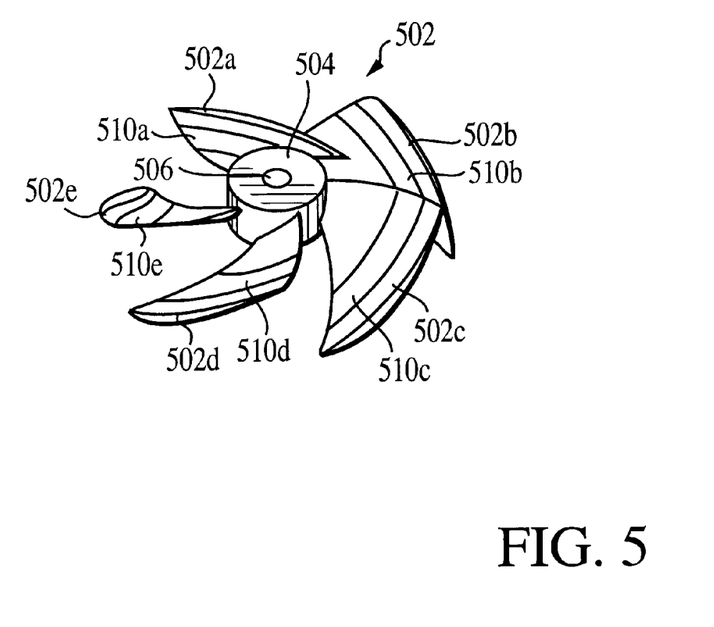
FIG. 5 is a perspective view of an alternate embodiment of axial flow impeller suitable for use in the hair dryer depicted in FIG. 1.

The configuration of the various components of the motorless impeller systems discussed above can be different from what is discussed above. FIG. 5 shows a particular alternate impeller member embodiment. The impeller member 502 has plural blades 502*a*, 502*b*, 502*c*, 502*d* and 502*e*, connected to a central hub 504. The hub has a central opening 506 that accepts a bearing (not shown) for mounting the impeller member to a shaft as discussed above.

The impeller member 502 includes conductive inserts 510*a*, 510*b*, 510*c*, 510*d* and 510*e* in each blade, instead of the conductive outer ring 210 in the previous embodiment. The impeller member 502 can be injection molded of a suitable plastic material, with the bearing and the conductive inserts molded in place.

Other impeller member embodiments could be injection molded from plastic containing a suitable metallic powder such as aluminum mixed with it, in which case separate metallic inserts or rings are unnecessary. Other powder materials that can be used are carbon black or super black. Electrically conducting polymers can also be used.

In any case, the present invention does not require a separate motor or a transmission mechanism to transmit motive power to the impellers from the separate motor. It therefore eliminates two significant sources of noise while still providing a hair dryer that delivers sufficient air flow.

It also can simplify construction of prior art axial flow hair dryers because it makes it practicable to use counter-rotating impellers. Accordingly, stators such as those shown in U.S. Pat. No. 6,011,903 become optional.

Moreover, the present invention is not limited to use in hair dryers with counter-rotating impellers, and can be used for applications other than hair dryers. For example, it can be used to power the impeller in the multi-function air heater disclosed in the above-mentioned U.S. Pat. No. 4,593,179. It can also be used in devices that use tangential flow fans such as the heat gun defroster shown in U.S. Pat. No. 3,211,890 or the hair dryers shown in U.S. Pat. Nos. 3,284,611 and 3,905,379. (All of the patents mentioned herein are incorporated by reference as if set out in full.) The invention can also be used with centrifugal compressors, as well.

A tangential flow compressor typically includes an impeller member with plural impeller elements mounted parallel to its axis of rotation by suitable supporting structure, as shown in the above-mentioned patents. To power such a compressor using the present invention a conductive ring or the like is incorporated into the impeller member and a stator ring like that discussed above is placed proximate to the conductive ring. A centrifugal flow compressor typically has an impeller member with impeller elements backed by a plate. In that application of the present invention, the conductive ring or similar structure could be carried by the plate with the stator ring mounted proximate to the conductive ring.

While preferred embodiments of the invention have been depicted and described, it will be understood that various modifications and changes can be made other than those specifically pointed out without departing from the spirit and scope of the invention, which is defined solely by the claims that follow.

What is claimed is:

1. A pump for transporting a fluid, the pump comprising:

a rotary impeller member including a plurality of impeller elements disposed for imparting kinetic energy to the fluid as said impeller member rotates, said impeller member including an electrically conductive portion of a substantially nonmagnetically-permeable material disposed along a rotary path of said impeller member;

an impeller driver including a magnetically permeable stator extending in an arc proximate to the rotary path of said conductive portion as said impeller member rotates, said impeller driver including a core portion with an electrically conductive winding for inducing a magnetic field in said stator and an electrically conductive shaded pole portion spaced from said core portion; and means for introducing alternating electrical current to said winding for imparting a rotary force to said electrically conductive portion of said impeller member.

2. A pump as in claim 1, comprising two said core portions and two said pole portions, wherein:

said stator comprises a ring substantially surrounding said impeller member;

said winding comprises two coils, each of which is wound around one of said core portions; and each said pole portion comprises an electrically conductive member mounted on said ring.

3. A pump as in claim 2, wherein:

said ring includes two circumferential slots, each formed by an outer circumferentially extending portion of said ring and an inner circumferentially extending finger on said ring; and each said inner finger has thereon a conductive sheath comprising one of said pole portions.

4. A pump as in claim 2, wherein said impeller member comprises an axial flow impeller with plural impeller blades and said conductive portion comprises a metallic ring surrounding said impeller blades.

5. A pump as in claim 4, wherein said axial flow impeller is molded from a plastic material with metallic inserts comprising said conductive portion.

6. A pump as in claim 2, wherein said axial flow impeller comprises a plastic material impregnated with conductive material.

7. A pump as in claim 1, wherein said impeller member comprises an axial-flow compressor.

8. A pump as in claim 1, wherein said impeller member comprises a centrifugal compressor.

9. A pump as in claim 1, wherein said impeller member comprises a tangential-flow compressor.

10. A hand held hair dryer comprising:

a duct having an air inlet and an air outlet;

a rotary impeller member including a plurality of impeller elements disposed for rotation about a shaft mounted in said duct to impart kinetic energy to air flowing in said duct from said air inlet to said air outlet as said impeller member rotates, said impeller member including an electrically conductive portion of a substantially nonmagnetically-permeable material disposed along a rotary path of said impeller member;

an impeller driver including a magnetically permeable stator mounted to said duct and extending in an arc proximate to the rotary path of said conductive portion, said impeller driver including two core portions having electrically conductive windings for inducing a magnetic field in said stator and two electrically conductive shaded pole portions spaced from said core portions;

means for introducing alternating electrical current to said windings for imparting a rotary force to said electrically conductive portion of said impeller member; and a resistance heater in said duct for heating air flowing from said air inlet to said air outlet.

11. A hand held hair dryer as in claim 10, wherein said impeller member is an axial flow compressor.

12. A hand held hair dryer as in claim 10, wherein said impeller member is an tangential flow compressor.

13. A hand held hair dryer comprising:

a duct having an air inlet and an air outlet;

a first axial-flow rotary impeller member including a plurality of impeller blades disposed for rotation about a shaft mounted in- said duct to impart kinetic energy to air flowing in said duct from said air inlet to said air outlet as said first impeller member rotates, said first impeller member including an electrically conductive portion disposed along a rotary path of said first impeller member;

a first impeller driver including a ring of magnetically permeable material mounted to said duct and substantially surrounding said first impeller member proximate to the rotary path of said conductive portion thereof, said first impeller driver including two diametrically opposed core portions wound with electrically conductive coils for inducing a magnetic field in said ring and two diametrically opposed electrically conductive pole portions circumferentially spaced from said core portions;

a second axial-flow rotary impeller member disposed downstream of said first impeller member and including a plurality of impeller blades disposed for rotation about said shaft to impart kinetic energy to air flowing in said duct from said air inlet to said air outlet as said second impeller member rotates, said second impeller member including an electrically conductive portion disposed along a rotary path of said second impeller member;

a second impeller driver including a ring of magnetically permeable material mounted to said duct and substantially surrounding said second impeller member proximate to the rotary path of said conductive portion thereof, said second impeller driver including two diametrically opposed core portions wound with electrically conductive coils for inducing a magnetic field in said ring and two diametrically opposed electrically conductive pole portions circumferentially spaced from said core portions;

means for introducing alternating electrical current to said coils for imparting a rotary force in a first direction to said electrically conductive portion of said first impeller member and a rotary force in a second direction to said electrically conductive portion of said second impeller member; and a resistance heater in said duct downstream of said second impeller member for heating air flowing from said air inlet to said air outlet.

14. A hand held hair dryer as in claim 13, wherein:

each said pole portion is disposed at an open end of a circumferential slot in said ring terminating at its other end at one of said pole portions;

said open end of each said slot in said ring of said first and second impeller members is formed by an outer circumferentially extending portion of said ring and an inner circumferentially extending portion of said ring; and each said inner portion of each said ring has a terminal end proximate to one of said core portions and has a metallic sheath thereon comprising one of said pole portions.

15. A hand held hair dryer as in claim 14, wherein said impeller drivers are mounted in said duct with a space between said ring and a wall of said duct for permitting air flow through said space.

16. A hand held hair dryer as in claim 14, wherein said conductive portion of each said impeller member comprises a metallic ring surrounding said impeller blades.

17. A hand held hair dryer as in claim 14, wherein each said impeller member is molded from a plastic material with metallic inserts comprising said conductive portion.

18. A hand held hair dryer as in claim 14, wherein each said impeller member comprises a plastic material impregnated with conductive material.

19. A pump for transporting a fluid, the pump comprising:

a rotary impeller member including a plurality of impeller elements disposed for imparting kinetic energy to the fluid as said impeller member rotates, said impeller member including an electrically conductive portion of a substantially nonmagnetically-permeable material disposed along a rotary path of said impeller member;

an impeller driver including a magnetically permeable stator extending in an arc proximate to the rotary path of said conductive portion as said impeller member rotates, said impeller driver including a core portion with an electrically conductive winding for inducing a magnetic field in said stator and a separate electrically conductive shaded pole member spaced from said core portion; and means for introducing alternating electrical current to said winding for imparting a rotary force to said electrically conductive portion of said impeller member.

20. A pump as in claim 19, wherein said electrically conductive portion of said impeller member comprises a nonferrous metal.

21. A pump as in claim 19, comprising two said core portions and two said pole portions, wherein:

said stator comprises a ring substantially surrounding said impeller member, each said ring includes two circumferential slots;

each said slot is formed by an outer circumferentially extending portion of said ring and an inner circumferentially extending finger on said ring, each said inner finger having mounted thereon a conductive sheath comprising one of said separate pole portions; and said winding comprises two coils, each of which is wound around one of said core portions.

22. A pump for transporting a fluid, the pump comprising:

a rotary impeller member including a plurality of impeller elements disposed for imparting kinetic energy to the fluid as said impeller member rotates, said impeller member including an electrically conductive portion of a substantially nonmagnetically-permeable material disposed along a rotary path of said impeller member;

an impeller driver including a magnetically permeable stator extending in an arc proximate to the rotary path of said conductive portion as said impeller member rotates, said impeller driver including a core portion with an electrically conductive winding for inducing a magnetic field in said stator and an electrically conductive, substantially nonmagnetically-permeable shaded pole portion spaced from said core portion; and means for introducing alternating electrical current to said winding for imparting a rotary force to said electrically conductive portion of said impeller member.

23. A pump as in claim 22, wherein said electrically conductive portion of said impeller member comprises a nonferrous metal.

* * * * *

UNITED STATES PATENT AND TRADEMARK OFFICE
CERTIFICATE OF CORRECTION

PATENT NO. : 6,393,208 B1  
DATED : May 21, 2002  
INVENTOR(S) : Nosenchuck

It is certified that error appears in the above-identified patent and that said Letters Patent is hereby corrected as shown below:

<u>Title page,</u>  
Item [56], References Cited, U.S. PATENT DOCUMENTS, add the following:

| | | |
|---|---|---|
| -- 2,629,330 | 2/24/53 | Meline |
| 3,211,890 | 10/12/65 | Graves |
| 3,284,611 | 11/08/66 | Laing |
| 3,905,379 | 9/16/75 | Churas et al. |
| 4,593,179 | 6/3/86 | Schulz et al. |
| 4,596,921 | 6/24/86 | Hersh et al. |
| 4,758,132 | 7/19/88 | Hartwig |
| 5,607,329 | 3/4/97 | Cho et al. |
| 5,841,943 | 11/24/98 | Nosenchuck |
| 6,011,903 | 1/4/00 | Nosenchuck -- |

FOREIGN PATENT DOCUMENTS, add the following:

| | | |
|---|---|---|
| -- JP | 2-214439 | 8/27/90 |
| SU | 1433465 | 10/30/88 |
| JP | 61-31696 | 2/14/86 |
| JP | 3-82402 | 4/8/91 -- |

Signed and Sealed this

Seventeenth Day of September, 2002

Attest:

JAMES E. ROGAN  
*Attesting Officer*   *Director of the United States Patent and Trademark Office*